(12) United States Patent
Richardson et al.

(10) Patent No.: US 9,772,912 B2
(45) Date of Patent: Sep. 26, 2017

(54) CONFIGURABLE AND FAULT-TOLERANT BASEBOARD MANAGEMENT CONTROLLER ARRANGEMENT

(75) Inventors: David Richardson, Olympia, WA (US); Barry Kennedy, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/977,815

(22) PCT Filed: Mar. 28, 2012

(86) PCT No.: PCT/US2012/030958
§ 371 (c)(1),
(2), (4) Date: Apr. 22, 2014

(87) PCT Pub. No.: WO2013/147767
PCT Pub. Date: Oct. 3, 2013

(65) Prior Publication Data
US 2014/0229758 A1   Aug. 14, 2014

(51) Int. Cl.
*G06F 11/20* (2006.01)
*G06F 11/30* (2006.01)
(52) U.S. Cl.
CPC ...... *G06F 11/2007* (2013.01); *G06F 11/3006* (2013.01); *G06F 11/3058* (2013.01)
(58) Field of Classification Search
CPC ............. G06F 11/0784; G06F 11/0793; G06F 11/1417; G06F 11/3058; G06F 11/0757
See application file for complete search history.

(56) References Cited

U.S. PATENT DOCUMENTS

| 6,625,750 | B1 | 9/2003 | Duso et al. |
| 6,889,248 | B1 | 5/2005 | Scheer |
| 8,868,790 | B2 * | 10/2014 | Lovett ............................ 370/463 |
| 2003/0182483 | A1 * | 9/2003 | Hawkins ............... G06F 9/4411 710/110 |
| 2006/0281368 | A1 | 12/2006 | Shih et al. |
| 2009/0271655 | A1 | 10/2009 | Hotta et al. |

(Continued)

FOREIGN PATENT DOCUMENTS

| CN | 1773461 A | 5/2006 |
| CN | 101324877 A | 12/2008 |

(Continued)

OTHER PUBLICATIONS

International Search Report and Written Opinion received for PCT application No. PCT/US2012/030958, mailed on Nov. 16, 2012, 11 pages.

(Continued)

*Primary Examiner* — Jigar Patel
(74) *Attorney, Agent, or Firm* — Jordan IP Law, LLC

(57) ABSTRACT

Systems and methods utilize a configurable and fault-tolerant baseboard management controller (BMC) arrangement in a multi-node system. In one example, the method may include designating a first BMC of the plurality of BMCs in a role of master BMC, determining that the first BMC can no longer serve the role of master BMC, and designating the BMC other than the first BMC to serve the role of the master BMC.

21 Claims, 2 Drawing Sheets

(56) References Cited

U.S. PATENT DOCUMENTS

2011/0010584 A1* 1/2011 Kochar ............... G06F 11/0724
714/32
2011/0153798 A1* 6/2011 Groenendaal ........... H04L 63/20
709/223

FOREIGN PATENT DOCUMENTS

CN 101663650 A 3/2010
WO 2013147767 A1 10/2013

OTHER PUBLICATIONS

International Preliminary Report on Patentability received for PCT Patent Application No. PCT/US2012/030958, mailed on Oct. 9, 2014, 8 pages.

* cited by examiner

CONFIGURABLE AND FAULT-TOLERANT BASEBOARD MANAGEMENT CONTROLLER ARRANGEMENT

BACKGROUND

Technical Field

Embodiments generally relate mitigating the effects of a fault in a multi-node server system. More particularly, embodiments relate to utilizing a baseboard management controller (BMC) arrangement in multi-node server.

Discussion

Server systems may utilize a single chassis containing multiple nodes. These server systems may utilize a chassis management controller, separate from the nodes, to centrally manage system resources. However, if the chassis management controller fails, the operation of the entire system may fail. Accordingly, implementing a configurable and fault-tolerant server system embodiment may be beneficial.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
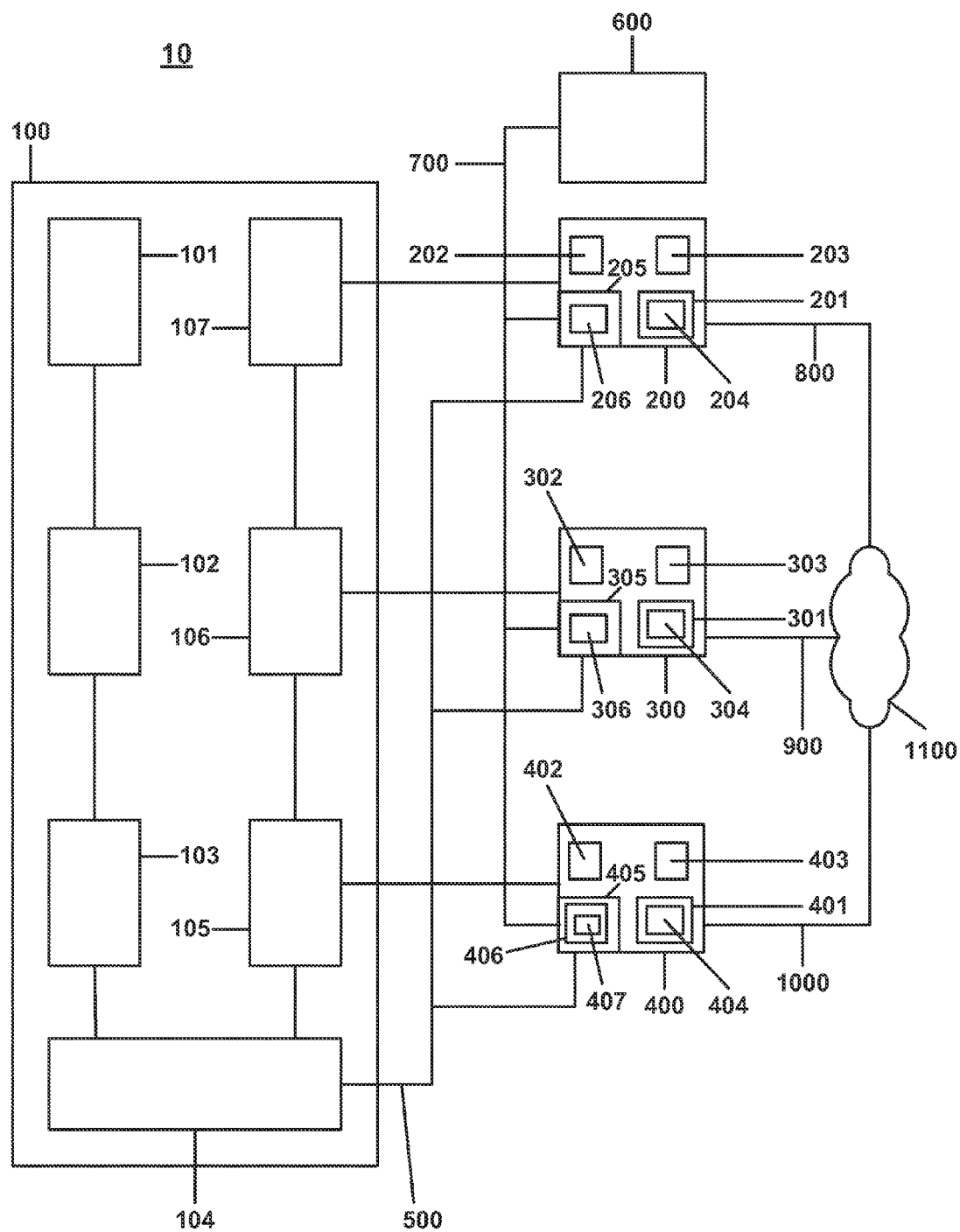
FIG. 1 is a block diagram of an example of a computing system that implements a configurable and fault-tolerant baseboard management controller arrangement in accordance with an embodiment of the invention.

Turning now to FIG. 1, a block diagram of a computing system 10 utilizing a configurable and fault-tolerant baseboard management controller arrangement is shown. The computing system 10 may include, among other things, a chassis 100, a first node server 200, a second node server 300, a third node server 400, input/output (I/O) expander 600. The computing system 10 may be coupled to a network 1100.

The chassis 100 may include a first node 101, a second node 102, and a third node 103. The nodes 101, 102, 103 may be any replaceable unit that includes one or more components. Examples of these components include, among other things, a hard disk drive, a baseboard, a bridgeboard, or a docking board.

The chassis 100 may also include a first fan 105, a second fan 106, and a third fan 107. The fans 105, 106, 107 may be used to cool components within the chassis 100. The chassis may also include a power supply 104. The power supply 104 may be utilized to supply power to various components in the chassis 100. As used herein, the fans 105, 106, 107 and the power supply 104 may be examples of a system resource. Other system resources may include hard drives, sensors, hard drives and storage backplanes.

The first node server 200 may be a computer server system configured to monitor, manage, support, and control aspects of the operation of the first node 101. Similarly, the second node server 300 and the third node server 400 may be configured to monitor, manage, support, and control aspects of the operation of the second node 102 and the third node 103 respectively.

The first node server 200 may include a first node memory component 201, a first node firmware component 202, and a first node processing component 203. Similarly, the second node server 300 may include a second node memory component 301, a second node firmware component 302, and a second node processing component 303. Also, the third node server 400 may include a third node memory component 401, a third node firmware component 402, and a third node processing component 403.

The first node memory component 201 may include a first node server application 204 that may be configured to, among other things, monitor, manage, support, and control aspects of the operation of the first node 101. Similarly, the second node memory component 301 may include a second node server application 304, which may be utilized similarly with respect to the second node 102. Also, the third node memory component 401 may include a third node server application 404 which may be utilized similarly with respect to the third node 103.

The first node server 200 may also include a first node BMC 205, which may configured to monitor, manage, support, and control aspects of the operation of the multi-node system. In this embodiment, it may, among other things, be configured to monitor, manage, support and control aspects of the operation of its associated node, the first node 101.

For example, the first node BMC 205 may be configured to, among other things, convey information (e.g., power levels, temperatures readings, and voltage level information) relating to the operation of the first node 101. In addition, the first node BMC 205 may also be configured to facilitate interfacing between the first node 101 and any entity configured to monitor, manage, support, and control the operation of the first node 101 (e.g., the first node server application 204). The second node BMC 305 may be configured to operate similarly with respect to the second node 102. Also, the third node BMC 405 may be configured to operate similarly with respect to the third node 103 as well.

The first node BMC 205 may include a first node BMC firmware component 206. Similarly, the second node BMC 305 may include a second node BMC firmware component 306. Also, the third node BMC may include a third node BMC memory component 406, wherein the third node BMC memory component 406 may include a third node BMC software application 407. The first node BMC firmware component 206, the second node BMC firmware component 306, and the third node BMC software application 407 may be configured to, among other things, direct power supply to the chassis 100 by transmitting instructions to the power supply 104 through a power management bus 500.

The I/O expander 600 may be a component that may, among other things, allow a BMC (e.g., the first node BMC 205) to detect the absence or presence of a node (e.g., the first node 101) in the computer system 10. The I/O expander 600 may be coupled to the first node BMC 205, the second node BMC 305, and the third node BMC 405 by an inter-node BMC bus 700.

The network 1100 may be coupled to the first node BMC 205, the second node BMC 305, and the third node BMC 405 by a first network interface 800, a second network interface 900, and a third network interface 1000 respectively. These network interfaces may be utilized to, among other things, remotely configure various components of the computer system 10.

In embodiments of the present invention, any coupled BMC may assume the role of a "master" BMC for a multi-node system. Once a BMC has been designated as master, the designated master BMC may serve as the master BMC for all coupled nodes in the system, including its associated node. In other words, the master BMC may serve as a central interface with respect to the operation of the multi-node system. When a master BMC is designated, any other BMC in the multi-node system may take the role as "slave".

Examples of aspects of the operation of a node that may be implemented by a master BMC may include, but are not limited to, monitoring aspects (e.g., temperature power) of system components, management (e.g., transmitting relevant related data to system components) of system components, support (e.g., procuring and installing firmware and software updates), and control (e.g., directing configuration of a system resource) of system components. Implementing such aspects by a single, master BMC may, among other things, reduce system congestion (e.g., traffic on a communication bus) and avoid redundancies (e.g., in installing software updates).

In embodiments of the present invention, an algorithm may be configured to designate a master BMC. The algorithm may determine, among other things, which BMC to initially designate as the master, or which BMC to designate a new master once a current master BMC may no longer is available. A current master BMC may no longer be available for various reasons, including failure, removal (e.g., physical removal), or by direction by a system component. Indeed, as will be described in greater detail, a system component such as a firmware component (e.g., the first node BMC firmware component 206) or a software application (e.g., the third node BMC software application 407) may, among other things, initially designate a master BMC, remove master status from a current master BMC, and designate a new master BMC.

In certain embodiments, an algorithm may designate a master BMC based on a node identification number. For example, one such algorithm may designate a master BMC based on lowest identification number. So, in the embodiment described in FIG. 1, such an algorithm may designate the first node BMC 206 as the master BMC first, followed by the second node BMC 207, and so forth.

In embodiments of the present invention, a master BMC may be designated and configured by various means. For example, a master BMC may be designated and configured by a BMC firmware component (e.g., the first node firmware component 202) or by executing a software application (e.g., the first node server application 204).

In other embodiments, a BMC may be configured utilizing an application through a host interface affiliated with any coupled node. An example of such an application may be a setup utility, such as basic input/output system (BIOS).

A BMC may also be configured through a remote connection. For example, a network, such as the network 1100, may utilize a network interface (e.g., the first network interface 800) to designate and configure a master BMC remotely (e.g., via Ethernet, Local Area Network (LAN), etc.).

A master BMC may transmit information regarding the master BMC's ownership of the master status (e.g., configuration information, settings information) to facilitate the transfer of the role of master BMC to another BMC if necessary. So, for example, if the first node BMC 205 is designated as master, it may periodically transmit information to the slave BMCs (e.g., the second node BMC 305, the third node BMC 405), to facilitate a (future) transfer of the role of master to a slave.

The arrangement and numbering of blocks depicted in FIG. 1 may be not intended to imply an order of operations to the exclusion of other possibilities. Those of skill in the art will appreciate that the foregoing systems and methods are susceptible of various modifications and alterations.

For example, in the embodiment described in FIG. 1, one BMC (e.g., BMC 206) may be primarily affiliated with one node (e.g., node 101). This need not necessarily be the case. Other embodiments of the present invention may allow a single BMC to monitor, manage, support, and control more than one node.

Figure 2:
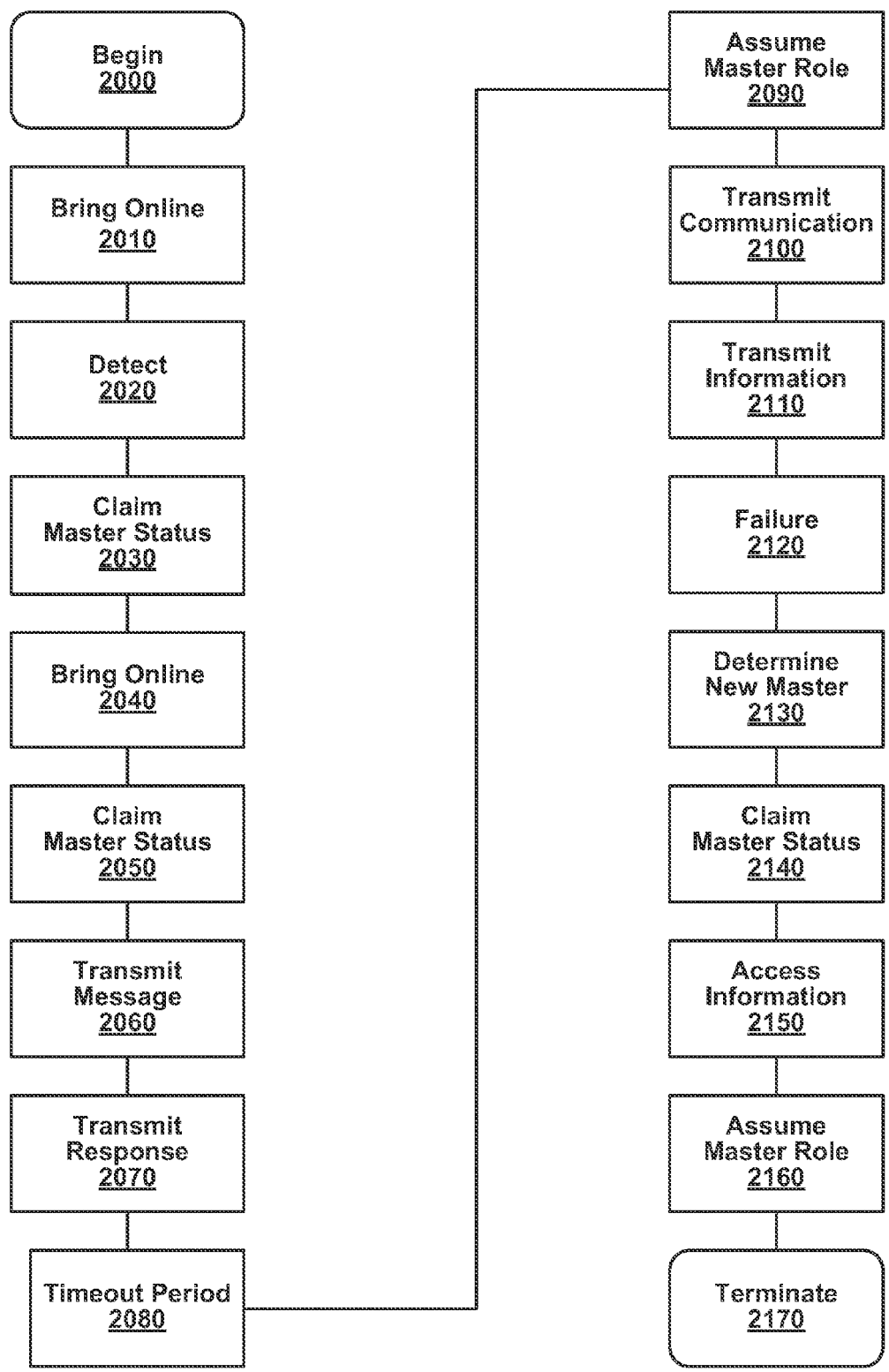
FIG. 2 is a flowchart of an example of a method of utilizing a configurable and fault-tolerant baseboard management controller arrangement in accordance with an embodiment of the invention.

Turning now to FIG. 2, a flowchart of an exemplary method of utilizing a configurable and fault-tolerant baseboard management controller arrangement according to one embodiment of the present invention is shown. The method might be implemented as a set of logic instructions stored in a machine- or computer-readable storage medium such as random access memory (RAM), read only memory (ROM), programmable ROM (PROM), firmware, flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), complementary metal oxide semiconductor (CMOS) or transistor-transistor logic (TTL) technology, or any combination thereof. For example, computer program code to carry out operations shown in the method may be written in any combination of one or more programming languages, including an object oriented programming language such as Java, Smalltalk, C++ or the like and conventional procedural programming languages, such as the "C" programming language or similar programming languages.

In this embodiment, a first node BMC, such as the first node BMC 205 (FIG. 1), may be brought online after a second node BMC, such as the second node BMC 305 (FIG. 1) and a third node BMC, such as the third node BMC 405 (FIG. 1). The first node BMC may have an identification number of one, the second node may have an identification number of two, and so forth.

The method may begin at processing block 2000. At processing block 2010, the second node BMC and the third node BMC may be brought online. At processing block 2020, the second node BMC and the third node BMC may detect each other's presence via an I/O expander, such as the I/O expander 600 (FIG. 1). At processing block 2030, an algorithm implemented by a BMC firmware component of the second node BMC, such as the second node BMC firmware component 306 (FIG. 1), may determine that the second node BMC should assume the role of master BMC status based on lowest node identification number. The third node BMC, having a higher node identification number, may operate as a slave BMC.

At processing block 2040, the first node BMC may be brought online. At processing block 2050, a BMC firmware component of the first node BMC, such as the first node BMC firmware component 206 (FIG. 1), may determine that it should claim master BMC status based on lowest identification number (i.e., 1). At processing block 2060, the first node BMC may transmit a message to announce that it may assume the role of master BMC.

At processing block 2070, the second node BMC, still operating in the role of master, may transmit a response to the first node BMC indicating that it will be relinquishing the role of master BMC. The message may also include any information relating to the second node BMC's role as master BMC (e.g., system resource configurations, system status information, etc.). At processing block 2080, the first node BMC may institute a timeout period to allow any system component to object to its assumption of the role of master BMC.

At processing 2090, after the timeout period has passed without any objections, the first node BMC may assume the role of master BMC from the second node BMC. At processing block 2100, the first node BMC may transmit a communication (e.g., system status information) within a timeout period to indicate its assumption of the role of master BMC may be complete. At processing block 2110, the first node BMC may periodically transmit information regarding the first node BMC's ownership of the master status (e.g., configuration information, settings information) to, among other things, facilitate the transfer of the role of master BMC if necessary.

At processing block 2120, the first node BMC may fail (e.g., due to a firmware failure). At processing block 2130, after the first node BMC has failed to send out a message within a timeout period, at least one of the other coupled nodes may determine that the current master BMC (i.e., the first node BMC) may no longer be working, and determine which node should be the new master BMC. In this case the BMC firmware component of the second node BMC may determine that the second node BMC should assume the role of master (i.e., based on lowest identification number).

At processing block 2140, the second node BMC may claim master BMC status. At processing block 2150, the second node BMC may access the information primarily transmitted by the first node BMC regarding the first node BMC's ownership of the master status to facilitate its assumption of the role of master BMC. At processing block 2160, the second node BMC may assume the role of master BMC. At processing block 2170, the process may terminate.

The sequence and numbering of processing blocks depicted in FIG. 2 is not intended to imply an order of operations to the exclusion of other possibilities. Those of skill in the art will appreciate that the foregoing systems and methods are susceptible of various modifications and alterations.

For example, in the embodiment described above, an algorithm may implement by a BMC firmware component claims master BMC status based on lowest node identification number (i.e., processing block 2020). However, this need not necessarily be the case. In other embodiments, a BMC with a lower identification number may only be designated as the master BMC after the current master BMC fails.

Also, in the embodiment described above, the second node BMC may transmit a response to the first node BMC indicating that it is relinquishing the role of master BMC (i.e., processing block 2070). However, this need not necessarily be the case. In other embodiments, prior to sending such a message, the second node BMC may first indicate it is "busy" (e.g., in the middle of a power supply update). If the second node BMC indicates that it may be busy, the requesting first node BMC may periodically resend its request to assume the role of master BMC until it succeeds.

Embodiments may therefore provide a method to utilize a configurable and fault-tolerant baseboard management controller (BMC) arrangement in a multi-node system, comprising detecting a plurality of BMCs, designating a first BMC of the plurality of BMCs in a role of master BMC, and designating a BMC other than the first BMC in a role of slave BMC. The method may also include transmitting, by the first BMC, information relating to the first BMC's role as master BMC, determining that the first BMC is to no longer serve the role of master BMC, and designating the BMC other than the first BMC to serve the role of master BMC. In addition, the method may also include assuming, by the BMC other than the first BMC, the role of master BMC and utilizing, by the BMC other than the first BMC, the information relating to the first BMC's role as master BMC to assume the role of the master BMC.

In one example, the method may include implementing a timeout period to allow an objection to the designating the BMC other than the first BMC to serve the role of the master BMC.

In one example, the role of master BMC includes serving as an central interface with respect to at least one of monitoring, management, support, and control aspects of the multi-node system.

In another example, at least one of the designating a first BMC of the plurality of BMCs in a role of master BMC and the designating a BMC other than the first BMC of the plurality of BMCs in a role of slave BMC is based on an algorithmic determination.

In another example, the algorithmic determination is conducted by at least one of a firmware component and a software application.

In still another example, the algorithmic determination utilizes an identification number.

In one example, the first BMC is no longer to serve the role of the master BMC as a result of one of failure, physical removal, and direction by a system component.

In still another example, at least one of the first BMC and the BMC other than the first BMC is configured remotely through a network interface.

In one example, the first BMC is configured to at least one of monitor, manage, support, and control aspects of a node.

In yet another example, the first BMC is configured to at least one of monitor, manage, support, and control aspects of a plurality of nodes.

Embodiments may also include at least one machine readable medium comprising a plurality of instructions that in response to being executed on a computing device, cause the computing device to carry out any of the examples of the aforementioned method. Embodiments may also include an apparatus for utilizing a configurable and fault-tolerant baseboard management controller (BMC) arrangement in a multi-node system, comprising a processing component, a memory component including a first application, and a BMC configured to carry out any of the examples of the aforementioned method. Embodiments may also include a system for utilizing a configurable and fault-tolerant baseboard management controller (BMC) arrangement in a multi-node system comprising a chassis including a plurality of nodes and a power supply, and a node server including a processing component, a memory component including a first application, and a BMC configured to carry out any of the examples of the aforementioned method.

Still another embodiment may provide for a method of utilizing a configurable and fault-tolerant controller arrangement in a multi-node system, comprising designating a first controller of a plurality of controllers in a role of master controller, and designating a controller other than the first controller in a role of slave controller, determining that the first controller is to no longer serve the role of master controller, and assuming, by the controller other than the first controller, the role of master controller.

In one example, the method may include transmitting, by the first controller, information relating to the first controller's role as master controller.

In one example, the method may include designating the controller other than the first controller to serve the role of the master controller.

In still another example, the method may include utilizing, by the controller other than the first controller, information relating to the first controller's role as master controller to assume the role of the master controller.

In one example, the method may include implementing a timeout period to allow an objection to the designating the controller other than the first controller to serve the role of the master controller.

In still another example, the role of master controller includes serving as an central interface with respect to at least one of monitoring, management, support, and control aspects of the multi-node system.

In still another example, at least one of the designating a first controller of the plurality of controllers in a role of master controller and the designating a controller other than the first controller of the plurality of controllers in a role of slave controller is based on an algorithmic determination.

In one example, the algorithmic determination is conducted by at least one of a firmware component and a software application.

In yet another example, the algorithmic determination utilizes an identification number.

In one example, the first controller is no longer to serve the role of the master controller as a result of one of failure, physical removal, and direction by a system component.

In yet another example, at least one of the first controller and the controller other than the first controller is configured remotely through a network interface.

In one example, the first controller is configured to at least one of monitor, manage, support, and control aspects of a node.

In another example, the first controller is configured to at least one of monitor, manage, support, and control aspects of a plurality of nodes.

Embodiments may also include at least one machine readable medium comprising a plurality of instructions to utilize a configurable and fault-tolerant controller arrangement in a multi-node system that, in response to being executed on a computing device to carry out any of the examples of the aforementioned method. Embodiments may also include an apparatus to utilize a configurable and fault-tolerant controller in a multi-node system, comprising a processing component, a memory component including a first application, and a controller configured to carry out any of the examples of the aforementioned method.

Embodiments may also include a system to utilize a configurable and fault-tolerant controller arrangement in a multi-node system comprising a chassis including a plurality of nodes and a power supply, and a node server including a processing component, a memory component including a first application, and a controller configured to carry out any of the examples of the aforementioned method.

Yet another embodiment may include at least one computer readable storage medium comprising a set of instructions for utilizing a configurable and fault-tolerant baseboard management controller (BMC) arrangement in a multi-node system. The set of instructions, if executed by a processor, causes a computer to detect a plurality of BMCs, designate a first BMC of the plurality of BMCs in a role of master BMC, and designating a BMC other than the first BMC in a role of slave BMC. The set of instructions, if executed, may also transmit, by the first BMC, information relating to the first BMC's role as master BMC, determine the first BMC is to no longer serve the role of master BMC, and designate the BMC other than the first BMC to serve the role of master BMC. The set of instructions, if executed, may also assume, by the BMC other than the first BMC, the role of master BMC and utilize, by the BMC other than the first BMC, the information relating to the first BMC's role as master BMC to assume the role of the master BMC.

Another embodiment may include an apparatus for utilizing a configurable and fault-tolerant baseboard management controller (BMC) arrangement in a multi-node system, comprising a processing component, a memory component including a first application, and a BMC including a computer readable storage medium comprising a set of instructions. The set of instructions, if executed by a processor, causes a computer to detect a plurality of BMCs, designate a first BMC of the plurality of BMCs in a role of master BMC, and designating a BMC other than the first BMC in a role of slave BMC, and transmit, by the first BMC, information relating to the first BMC's role as master BMC. The set of instructions, if executed, may also determine the first BMC is to no longer serve the role of master BMC and designate the BMC other than the first BMC to serve the role of master BMC. The set of instructions, if executed, may also assume, by the BMC other than the first BMC, the role of master BMC and utilize, by the BMC other than the first BMC, the information relating to the first BMC's role as master BMC to assume the role of the master BMC.

Still another embodiment may include a system for utilizing a configurable and fault-tolerant baseboard management controller (BMC) arrangement comprising a chassis including a plurality of nodes and a power supply and a node server including a processing component, a memory component including a first application, and a BMC. The BMC may include a computer readable storage medium comprising a set of instructions, which, if executed by a processor, cause a computer to detect a plurality of BMCs, designate a first BMC of the plurality of BMCs in a role of master BMC, and designate a BMC other than the first BMC in a role of slave BMC. The set of instructions, if executed, may also transmit, by the first BMC, information relating to the first BMC's role as master BMC, determine the first BMC is to no longer serve the role of master BMC, and designate the BMC other than the first BMC to serve the role of master BMC. The set of instructions, if executed, may also assume, by the BMC other than the first BMC, the role of master BMC and utilize, by the BMC other than the first BMC, the information relating to the first BMC's role as master BMC to assume the role of the master BMC.

It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding. Any represented signal lines, whether or not having additional information, may actually include one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections and other components may or may not be shown within the figures, for simplicity of illustration and discussion, and so as not to obscure certain aspects of the embodiments of the invention. Further, arrangements may be shown in processing block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Several features and aspects of embodiments of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

We claim:

1. A method of utilizing a configurable and fault-tolerant baseboard management controller (BMC) arrangement in a multi-node system, comprising:
   detecting, by an input/output (I/O) expander, a plurality of BMCs, wherein the I/O expander is coupled to the BMCs;
   designating a first BMC of the plurality of BMCs in a role of master BMC, and designating a BMC other than the first BMC in a role of slave BMC, wherein the first BMC is configured to at least one of monitor, manage, support, and control aspects of one or more nodes of the multi-node system and wherein the role of master BMC includes serving as a central interface with respect to at least one of monitoring, management, support, and control aspects of the one or more nodes of the multi-node system;
   transmitting, by the first BMC, information relating to the first BMC's role as master BMC;
   determining, by the I/O expander, that the first BMC is to no longer serve the role of master as a result of one of failure, physical removal, or direction by a component of the multi-node system;
   designating the BMC other than the first BMC to serve the role of master BMC, including allowing a timeout period for one or more system components of the system to object to assumption of the role of master BMC by the BMC other than the first BMC;
   assuming, by the BMC other than the first BMC, the role of master BMC; and
   utilizing, by the BMC other than the first BMC, the information relating to the first BMC's role as master BMC to assume the role of the master BMC.

2. The method of claim 1, including implementing a timeout period to allow an objection to the designating the BMC other than the first BMC to serve the role of the master BMC.

3. The method of claim 1, wherein at least one of the designating a first BMC of the plurality of BMCs in a role of master BMC and the designating a BMC other than the first BMC of the plurality of BMCs in a role of slave BMC is based on an algorithmic determination.

4. The method of claim 3, wherein the algorithmic determination is conducted by at least one of a firmware component and a software application.

5. The method of claim 3, wherein the algorithmic determination utilizes an identification number.

6. The method of claim 1, wherein at least one of the first BMC and the BMC other than the first BMC is configured remotely through a network interface.

7. At least one non-transitory computer readable storage medium comprising a set of instructions for utilizing a configurable and fault-tolerant baseboard management controller (BMC) arrangement in a multi-node system, which, if executed by a processor, causes a computer to:
   detect, by an input/output (I/O) expander, a plurality of BMCs, wherein the I/O expander is coupled to the BMCs;
   designate a first BMC of the plurality of BMCs in a role of master BMC, and designating a BMC other than the first BMC in a role of slave BMC, wherein the first BMC is configured to at least one of monitor, manage, support, and control aspects of one or more nodes of the multi-node system and wherein the role of master BMC includes serving as a central interface with respect to at least one of monitoring, management, support, and control aspects of the one or more nodes of the multi-node system;
   transmit, by the first BMC, information relating to the first BMC's role as master BMC;
   determine, by the I/O expander, the first BMC is to no longer serve the role of master BMC as a result of one of failure, physical removal, or direction by a component of the multi-node system;
   designate the BMC other than the first BMC to serve the role of master BMC, including to allow a timeout period for one or more system components of the system to object to assumption of the role of master BMC by the BMC other than the first BMC;
   assume, by the BMC other than the first BMC, the role of master BMC; and
   utilize, by the BMC other than the first BMC, the information relating to the first BMC's role as master BMC to assume the role of the master BMC.

8. The at least one medium of claim 7, wherein, if executed, the instructions cause a computer to implement a timeout period to allow an objection to the designating the BMC other than the first BMC to serve the role of the master BMC.

9. The at least one medium of claim 7, wherein at least one of the designating a first BMC of the plurality of BMCs in a role of master BMC and the designating a BMC other than the first BMC of the plurality of BMCs in a role of slave BMC is based on an algorithmic determination.

10. The at least one medium of claim 9, wherein the algorithmic determination is conducted by at least one of a firmware component and a software application.

11. The at least one medium of claim 9, wherein the algorithmic determination utilizes an identification number.

12. The at least one medium of claim 7, wherein at least one of the first BMC and the BMC other than the first BMC is configured remotely through a network interface.

13. An apparatus for utilizing a configurable and fault-tolerant baseboard management controller (BMC) arrangement in a multi-node system, comprising:
    a processing component;
    a memory component including a first application; and
    a BMC including a computer readable storage medium comprising a set of instructions, which, if executed by a processor, cause a computer to:
        detect, by an input/output (I/O) expander, a plurality of BMCs, wherein the I/O expander is coupled to the BMCs;
        designate a first BMC of the plurality of BMCs in a role of master BMC, including to allow a timeout period for one or more system components of the system to object to assumption of the role of master BMC by the BMC other than the first BMC, and designate a BMC other than the first BMC in a role of slave BMC, wherein the first BMC is configured to at least one of monitor, manage, support, and control aspects of one or more nodes of the multi-node system and wherein the role of master BMC includes serving as an central interface with respect to at least one of monitoring, management, support, and control aspects of the one or more nodes of the multi-node system;
        transmit, by the first BMC, information relating to the first BMC's role as master BMC;
        determine, by the I/O expander, the first BMC is to no longer serve the role of master BMC as a result of one of failure, physical removal, or direction by a component of the multi-node system;
        designate the BMC other than the first BMC to serve the role of master BMC, including to allow a timeout period for one or more system components of the system to object to assumption of the role of master BMC by the BMC other than the first BMC;
        assume, by the BMC other than the first BMC, the role of master BMC; and
        utilize, by the BMC other than the first BMC, the information relating to the first BMC's role as master BMC to assume the role of the master BMC.

14. The apparatus of claim 13, wherein, if executed, the instructions cause a computer to implement a timeout period to allow an objection to the designating the BMC other than the first BMC to serve the role of the master BMC.

15. The apparatus of claim 13, wherein at least one of the designating a first BMC of the plurality of BMCs in a role of master BMC and the designating a BMC other than the first BMC of the plurality of BMCs in a role of slave BMC is based on an algorithmic determination.

16. An apparatus for utilizing a configurable and fault-tolerant baseboard management controller (BMC) arrangement in a multi-node system, comprising:
    means for detecting a plurality of BMCs, wherein the means for detecting the BMCs is coupled to the BMCs;
    means for designating a first BMC of the plurality of BMCs in a role of master BMC, and designating a BMC other than the first BMC in a role of slave BMC, wherein the first BMC is configured to at least one of monitor, manage, support, and control aspects of one or more nodes of the multi-node system and wherein the role of master BMC includes serving as a central interface with respect to at least one of monitoring, management, support, and control aspects of the one or more nodes of the multi-node system;
    means for transmitting, by the first BMC, information relating to the first BMC's role as master BMC;
    means for determining, by the means for detecting the BMCs, that the first BMC is to no longer serve the role of master as a result of one of failure, physical removal, or direction by a component of the multi-node system;
    means for designating the BMC other than the first BMC to serve the role of master BMC, including means for allowing a timeout period for one or more system components of the system to object to assumption of the role of master BMC by the BMC other than the first BMC;
    means for assuming, by the BMC other than the first BMC, the role of master BMC; and
    means for utilizing, by the BMC other than the first BMC, the information relating to the first BMC's role as master BMC to assume the role of the master BMC.

17. The apparatus of claim 16, including means for implementing a timeout period to allow an objection to the designating the BMC other than the first BMC to serve the role of the master BMC.

18. The apparatus of claim 16, wherein at least one of the means for designating a first BMC of the plurality of BMCs in a role of master BMC and the designating a BMC other than the first BMC of the plurality of BMCs in a role of slave BMC is based on an algorithmic determination.

19. The apparatus of claim 18, wherein the algorithmic determination is conducted by at least one of a firmware component and a software application.

20. The apparatus of claim 18, wherein the algorithmic determination utilizes an identification number.

21. The apparatus of claim 16, wherein at least one of the first BMC and the BMC other than the first BMC is configured remotely through a network interface.

* * * * *